(12) United States Patent
Pentzer et al.

(10) Patent No.: US 9,956,691 B1
(45) Date of Patent: May 1, 2018

(54) AUTOMATED GRIPPING TOOL

(71) Applicant: JLS Automation, York, PA (US)

(72) Inventors: Jon Pentzer, Hampstead, MD (US); Craig Hafner, Lutherville, MD (US)

(73) Assignee: JLS Automation, York, PA (US)

( * ) Notice: Subject to any disclaimer, the term of this patent is extended or adjusted under 35 U.S.C. 154(b) by 0 days. days.

(21) Appl. No.: 15/728,927

(22) Filed: Oct. 10, 2017

(51) Int. Cl.
| | | |
|---|---|---|
| *B25J 15/00* | (2006.01) | |
| *B25J 11/00* | (2006.01) | |
| *B25J 15/02* | (2006.01) | |
| *B65G 47/90* | (2006.01) | |
| *B25J 15/08* | (2006.01) | |

(52) U.S. Cl.
CPC ......... *B25J 11/0045* (2013.01); *B25J 15/024* (2013.01); *B25J 15/08* (2013.01); *B65G 47/90* (2013.01); *B65G 2201/0202* (2013.01)

(58) Field of Classification Search
CPC ...... B25J 11/0045; B25J 15/024; B25J 15/08; B65G 47/90
USPC .... 294/198, 86.4, 103.1, 106, 902; 414/406, 414/407, 408, 409; 901/37, 39
See application file for complete search history.

(56) References Cited

U.S. PATENT DOCUMENTS

| | | | | |
|---|---|---|---|---|
| 3,172,693 A | * | 3/1965 | Hansen | B66F 9/187 294/90 |
| 3,322,455 A | * | 5/1967 | Gressbach | B66C 1/422 294/104 |
| 4,461,608 A | * | 7/1984 | Boda | B65F 3/041 294/106 |
| 4,529,182 A | * | 7/1985 | Valentine | B25B 5/122 269/157 |
| 5,026,104 A | * | 6/1991 | Pickrell | B65F 3/046 294/106 |
| 5,398,983 A | * | 3/1995 | Ahrens | B65F 3/02 294/106 |
| 5,562,386 A | * | 10/1996 | Browning | B65F 3/04 414/406 |
| 6,644,906 B2 | * | 11/2003 | Bayne | B65F 1/1452 414/403 |
| 8,287,015 B2 | | 10/2012 | Hawes | |
| 8,474,893 B2 | * | 7/2013 | Kawanami | B25J 15/0213 294/106 |
| 8,827,559 B2 | * | 9/2014 | Gentry | F16B 7/10 384/35 |
| 8,833,823 B2 | * | 9/2014 | Price | B66C 1/44 294/198 |
| 9,333,655 B2 | | 5/2016 | Schanz et al. | |
| 2012/0146353 A1 | * | 6/2012 | Lunde | E21B 19/14 294/198 |
| 2013/0057007 A1 | * | 3/2013 | Howell | B65F 3/04 294/198 |
| 2016/0375590 A1 | | 12/2016 | Lessing et al. | |

\* cited by examiner

*Primary Examiner* — Paul T Chin
(74) *Attorney, Agent, or Firm* — Barley Snyder

(57) ABSTRACT

The automated gripping tool enables a user to move a food product from a first position to a second position while maintaining the integrity and appearance of the food product. The gripper tool makes use of flexible bands on a pair of gripping arms. The flexible bands are positioned to sandwich a food product between them with sufficient force to allow the food product to be repositioned and without damaging the integrity and appearance of the food product.

15 Claims, 10 Drawing Sheets

AUTOMATED GRIPPING TOOL

FIELD OF THE INVENTION

The field of the invention is directed to a tool for manipulating materials and, more particularly, an automated gripping tool for manipulating enrobed bakery products.

BACKGROUND

Increasingly, industries of all types are using robotic techniques for reasons of efficiency, precision, sanitation, and productivity. In the food industry, and particularly in the field of processed foods, robotics are of use in moving foods from one part of a production stream to another and ultimately into suitable packaging.

However, known robotic tools have proved inadequate to the handling of fragile baked and other processed foods and, in particular, for manipulating enrobed bakery products into packaging. Known devices have not provided sufficiently delicate handling which results in wasted product and increased costs to the manufacturer.

SUMMARY

The present invention permits the handling of food products, especially the movement of enrobed food products from a final production stage to a packaging stage, in a way that maintains the integrity and appearance of the food product.

Accordingly, an automated gripping tool is provided and includes

BRIEF DESCRIPTION OF THE DRAWINGS

The invention will now be described by way of example with reference to the accompanying figures of which.

DETAILED DESCRIPTION OF THE EMBODIMENT(S)

Figure 1:
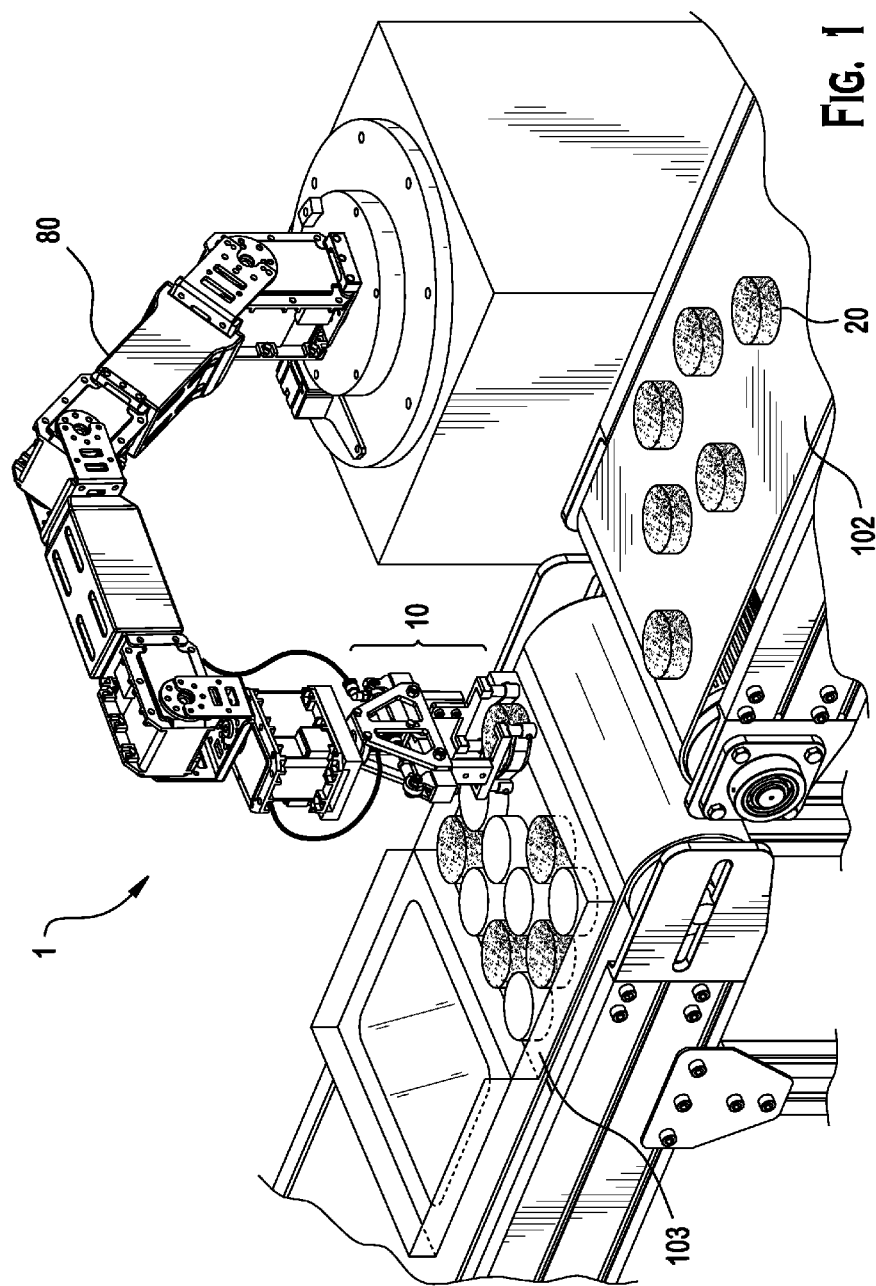
FIG. 1 is a perspective view of an embodiment of an automated gripping tool according to the invention, shown in operation on a production and packaging line.
Figure 2:
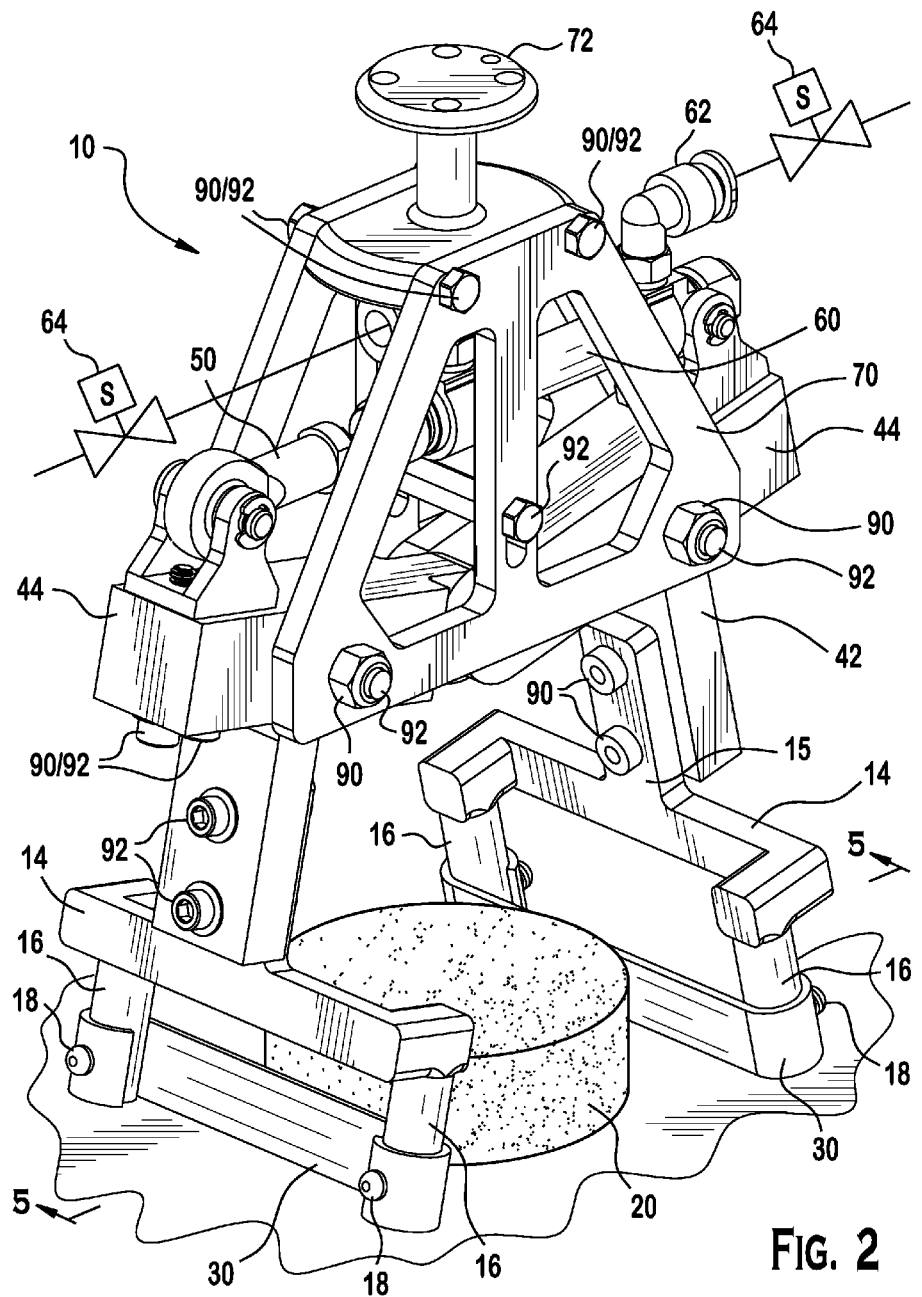
FIG. 2 is a perspective view of an automated gripping tool according to the invention, shown in a non-gripping position.
Figure 3:
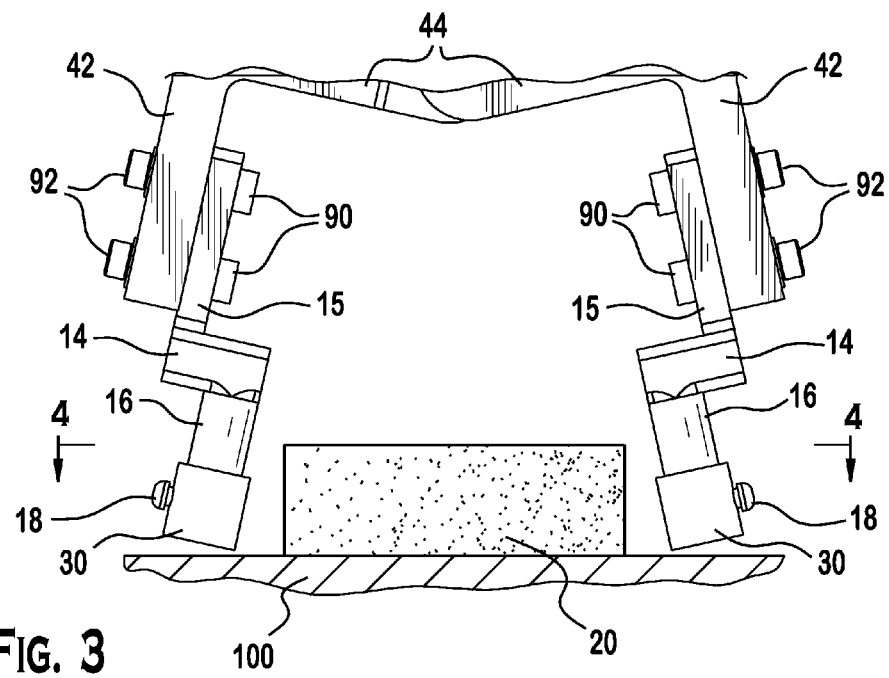
FIG. 3 is an side elevation view of the automated gripping tool of FIG. 2.
Figure 4:
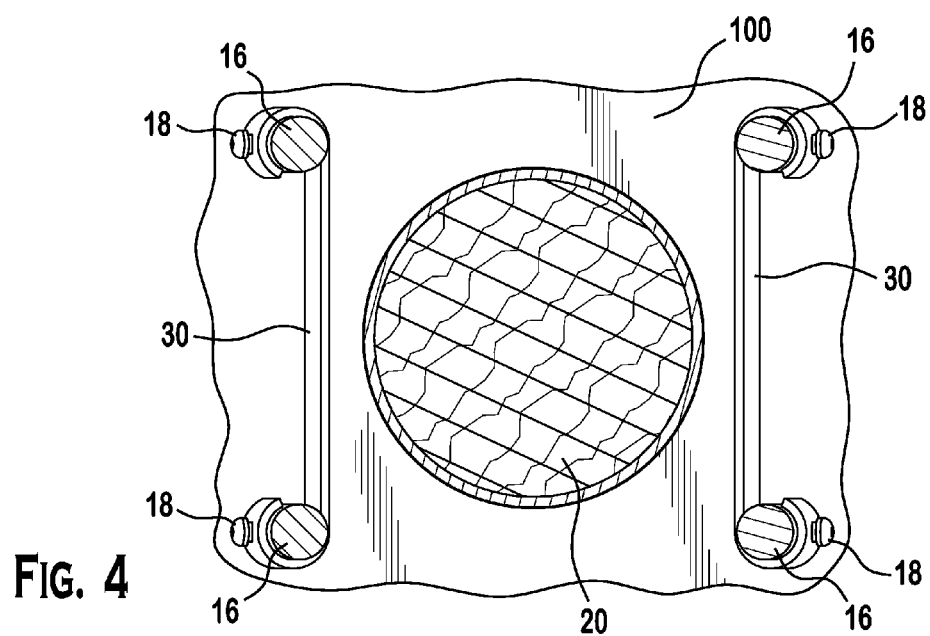
FIG. 4 is a top cross-section view of the automated gripping tool of FIG. 3 taken along line 4-4.
Figure 5:
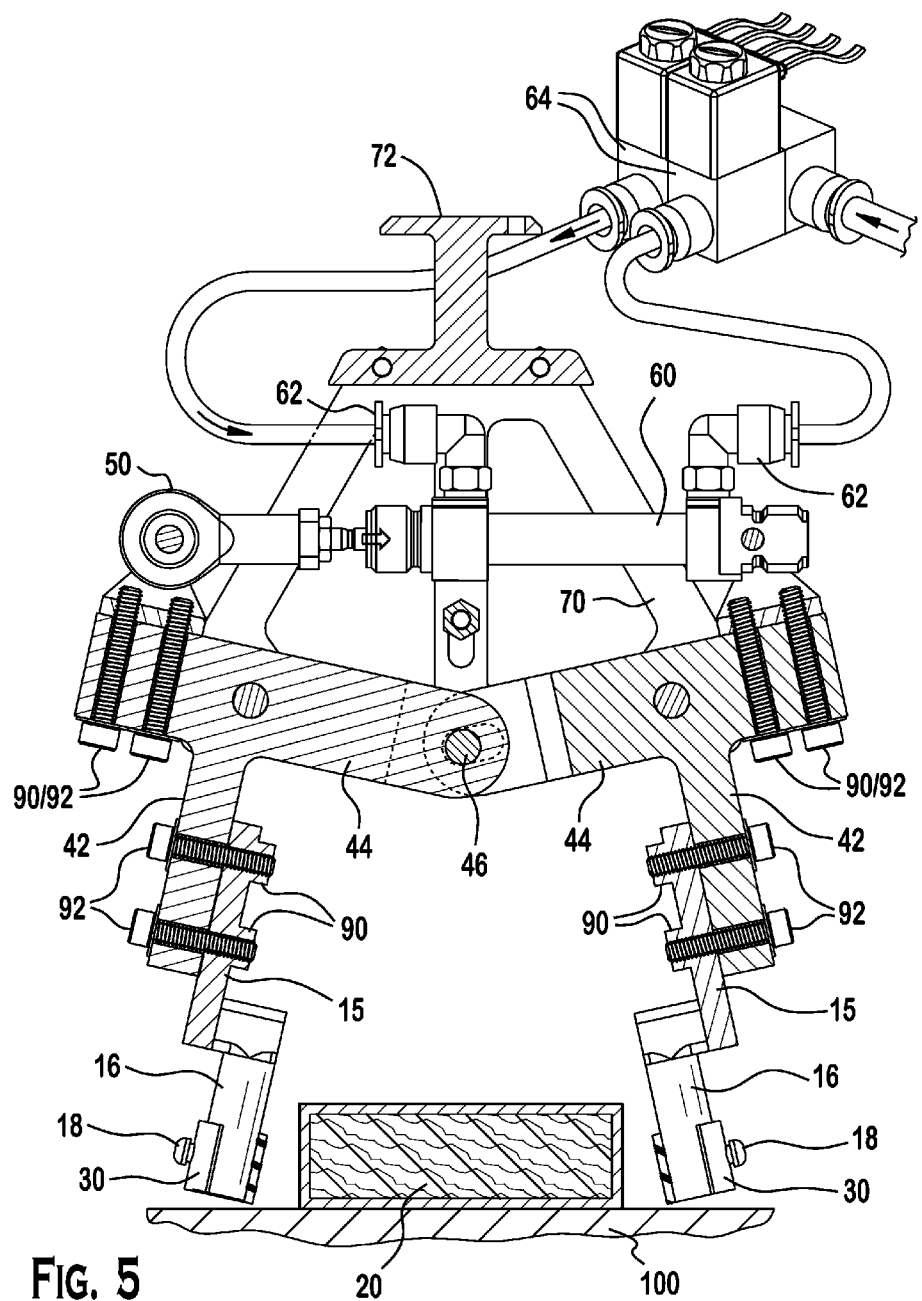
FIG. 5 is a side cross-section view of the automated gripping tool of FIG. 2 taken along line 5-5.
Figure 6:
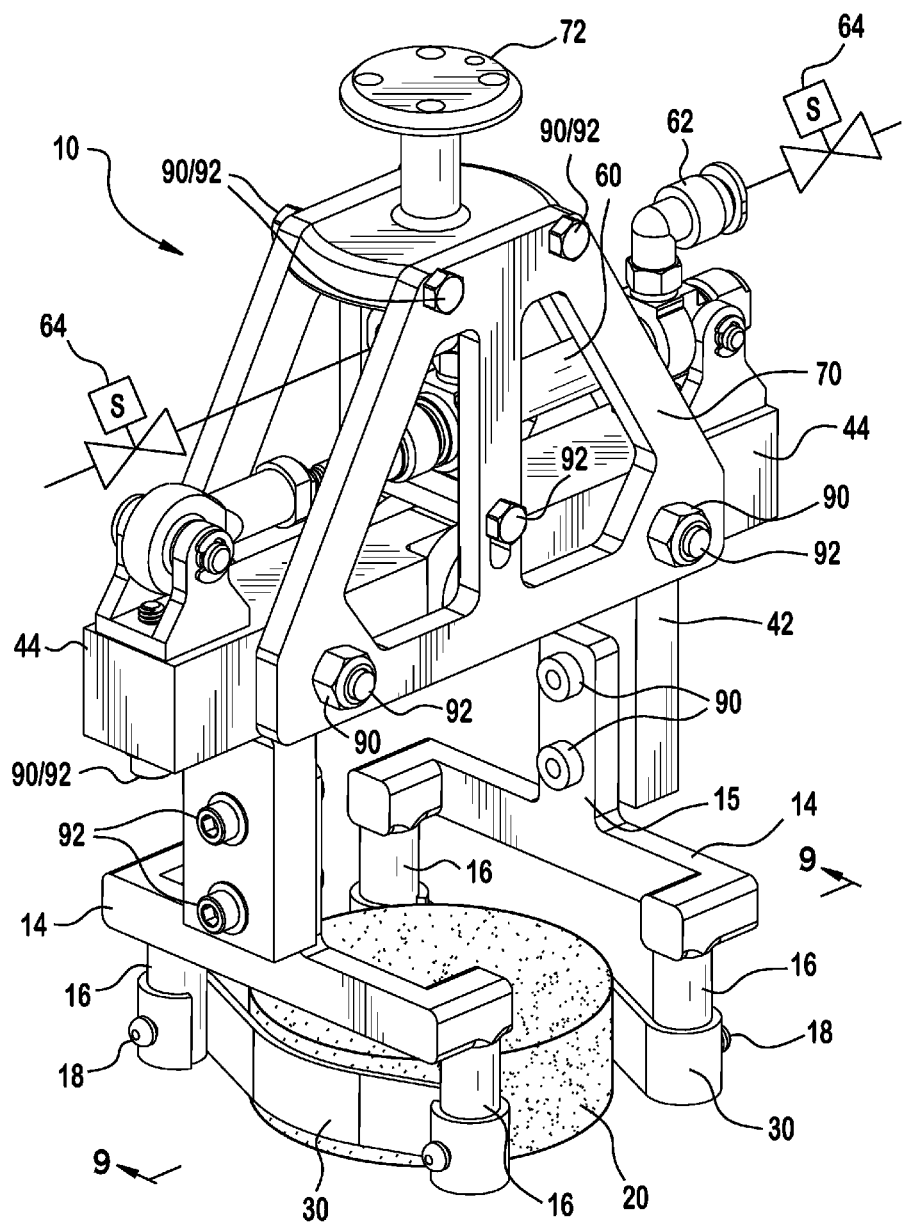
FIG. 6 is a perspective view of an automated gripping tool according to the invention, shown gripping a food product.
Figure 7:
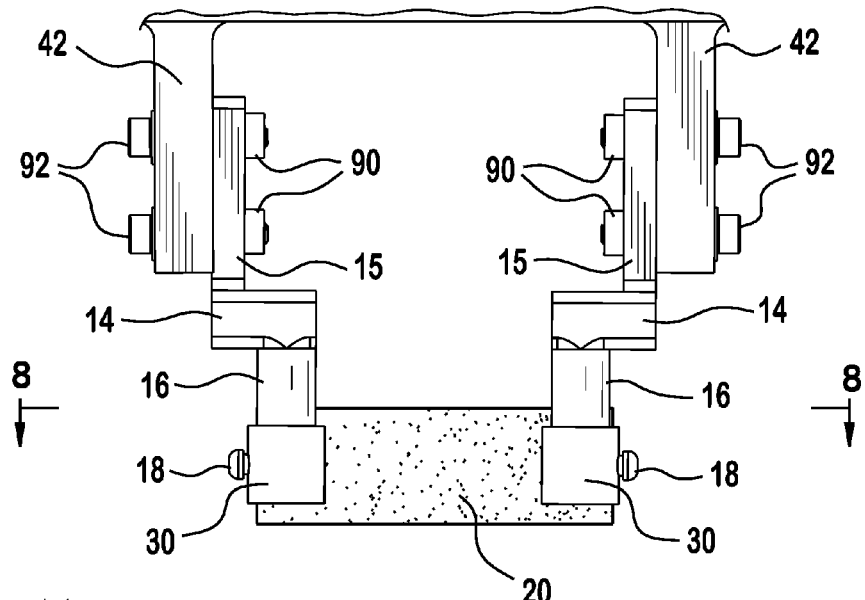
FIG. 7 is a front elevation view of the automated gripping tool of FIG. 6.

Referring to FIGS. 1-16, an automated gripping tool 10 according to the invention is shown and used in operation 1, for example, to move a food product 2 from one surface to another, particularly from a stage of the production process to a packaging or storage stage.

An exemplary embodiment of the automated gripping tool 10 generally includes the following major components: a pair of gripping arms 12, a hinging unit 40, and a frame 70.

With reference to FIGS. 1-16, each of the pair of gripping arms 12 includes a horizontal arm 14, a flange 15, and a pair of vertical supports 16. A first vertical support 16 of the pair of vertical supports 16 connected to one end of the horizontal arm 14, while a second vertical support 16 of the pair of vertical supports 16 is connected to the another end of the horizontal arm 14. The flange 15 is positioned between the pair of vertical supports 16, and extends upward from the horizontal arm 14 and away from the pair of vertical supports 16.

A flexible band 30 is positioned between the first vertical support 16 and a second vertical support 16 of each of the pair of gripping arms 12. In the shown embodiment, the flexible band 30 is removably attached to the first vertical support 16 and the second vertical support 16. In particular, the flexible band 30 is elastic and made from a rubber or other elastic material capable of elastic deformation and recovery.

Each of the pair of gripping arms 12 is attached with a plurality of fasteners 90 at a proximal end of the flange 15 to a pair of distally projecting control arms 42 with each extending from a pair of hinge arms 44. The pair of hinging arms 44 (hereinafter collectively referred to as the "hinging unit" 40) articulate about a pin 46, as shown particularly in FIGS. 2, 5, 6, 9, and 16 and as will be described in more detail below. The outer end of each of the pair of hinging arms 44 of the hinging unit 40 is connected with fasteners 90 respectively to a pneumatic actuator 50. The pneumatic actuator 50 is connected to a pneumatic cylinder 60 and is activated with pressurized gas 62 through a solenoid 64. The hinging unit 40 is secured with fasteners 90 and bolts 92 to the frame 70, which permits the hinging unit 40 to articulate about the pin 46. The frame 70 has a stem 72 for connecting the gripper tool 10 to a robotic arm 80.

One of skill in the art will appreciate that other configurations are possible within the spirit of the invention.

The automated gripping tool 10 enables a user to move the food product 20 from a first position 102 to a second position 103 while maintaining the integrity and appearance of the food product. When the integrity and appearance of the food product is retained, product waste is reduced. The first position 102 is generally in the last stage of the production process for the food product and the second position 103 generally is in a packaging or storage stage. The automated gripping tool 10 may additionally be used at other stages where its capabilities are advantageous. One of ordinary skill in the art is familiar with acceptable standards for integrity and appearance of food product.

The gripper tool 10 is designed to accommodate the dimensions of the food product to be handled. As shown in FIGS. 1-15, the pair of gripping arms 12, as an exemplary embodiment, is designed to handle a food product that is generally less than two times the height of the flexible band 30. As shown in FIG. 16, another exemplary embodiment is shown, in which a plurality of flexible bands 30 are secured on the first and second vertical supports 16 of each gripping arm 12. The plurality of flexible bands 30 are positioned so that they collectively sandwich a food product along its height and deter any pressure points. In such a case, the length of the vertical supports 16 of each gripping arm 12 is designed to accommodate the height of the food product 2. The fasteners 90 connecting the flanges 15 to the respective control arm 42 of the hinging unit 40 may be removable to allow the gripper tool 10 to be equipped for use with a variety of food products.

The claimed invention makes use of the elasticity of the flexible bands 30 that are removably affixed to the gripping arms 12. In operation, the pair of gripping arms 12 move towards each other, bringing the flexible bands 30 into contact with a food product 20 positioned between the flexible bands 30. Sufficient force is applied so that the food product 20 is sandwiched between the flexible bands 30. More particularly, the flexible bands 30 are brought horizontally towards each other with sufficient force. Since the flexible bands 30 are elastic, the flexible bands 30 conform to the shape and size of the food product 20 in a way that exerts a uniform load across the face of the food product. This uniformity of load across the face of the food product 20 maintains the integrity and appearance of the food product. This is in contrast to the known art that uses "fingers" to grasp and move a food item where each "finger" exerts a localized point of pressure on the food product, which can result in damage to the food product. This is also in contrast to the known art, which uses a scooping device to move a food item where the scooping device can result in damage to the food product.

Figure 10:
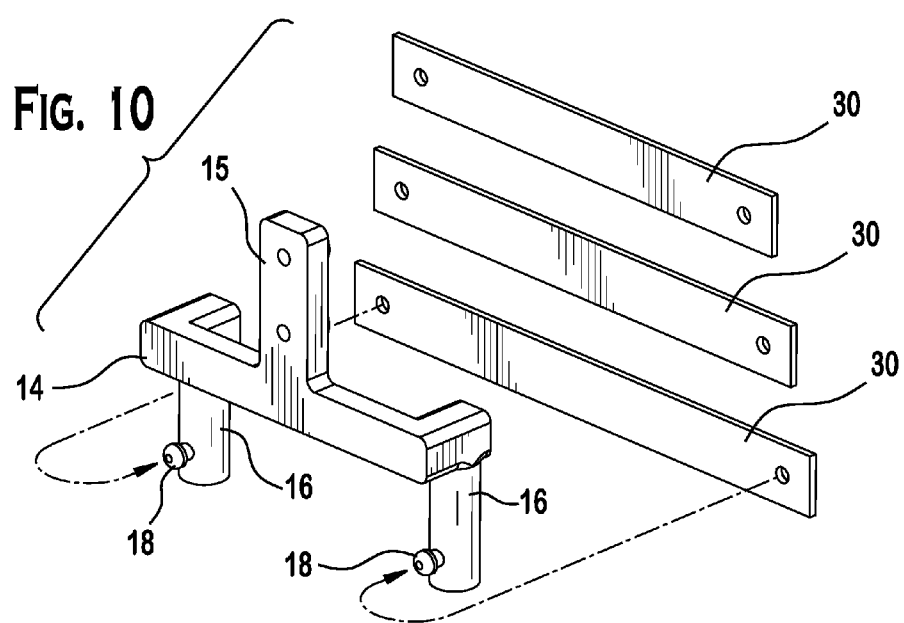
FIG. 10 is an exploded view showing a griping fixture of the automated gripping tool according to the invention.
Figure 11:
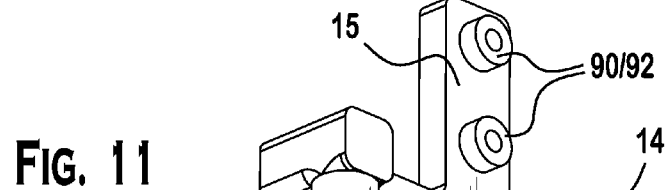
FIG. 11 is a bottom, side perspective view of a gripping arm a griping fixture of the automated gripping tool according to the invention.
Figure 12:
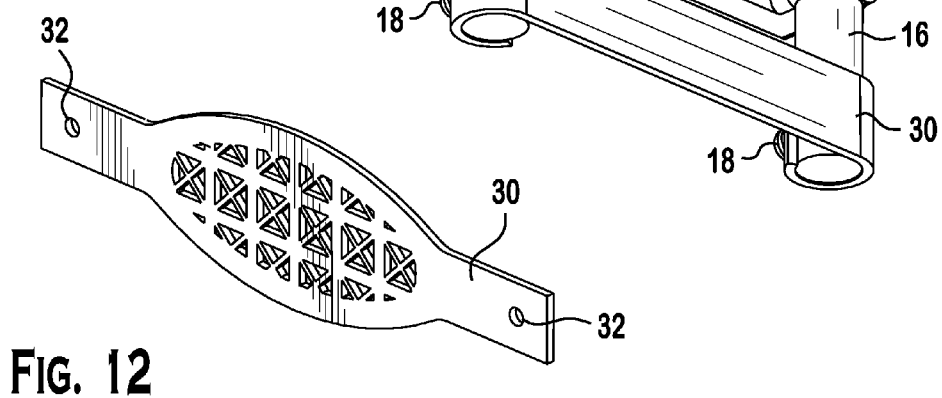
FIG. 12 is a perspective view of a flexible band of the automated gripping tool according to the invention.

As shown in FIGS. 1-16, the flexible bands 30 are planar and of a generally rectilinear shape conforming to the dimensions of the gripping arms 12. As shown in exploded perspective view FIG. 10, the flexible bands 30 include a fastener receiving passageway 32 positioned at each end of the flexible band 30 designed to accommodate an attachment point 18 on the outward face of the vertical supports 16 of each pair of gripping arms 12. The midpoint of the flexible band 30 is positioned at the inward facing side of each gripping arm 12 and the ends of the flexible band 30 are stretched towards and wrapped around the vertical supports 16 of the gripping arm 12 to be removeably secured with the fastener receiving passageways 32 at the attachment points 18 on the vertical supports 16. FIG. 11 is a perspective view from below a one of a pair of gripping arms 12 showing the flexible band 30 in place. The flexible bands 30 may be constructed as in the embodiment shown in FIG. 12 with an alternative shape or design. Such an alternate band design is chosen to impart a desired imprint on one or both sides of the face of the food product 20 or to create less contact area with the food product than a solid band.

The flexible bands 30 are removably attached to the gripping arms 12 to permit replacement for maintenance, for sanitary and hygienic purposes, or to permit the use of an alternate design of the flexible band 30. FIG. 10 shows flexible bands 30 of various lengths that are chosen to impart a lesser or greater tension about the food product 20 or to accommodate variously shaped food products.

Figure 8:
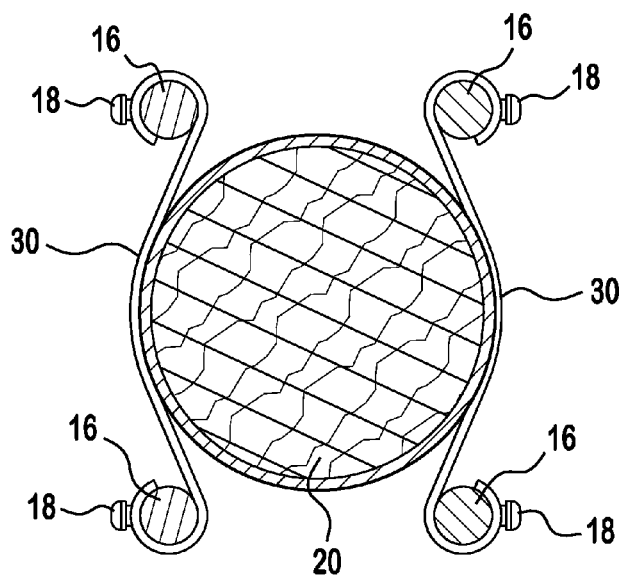
FIG. 8 is a top cross-section view of the automated gripping tool of FIG. 7 taken along line 8-8.
Figure 9:
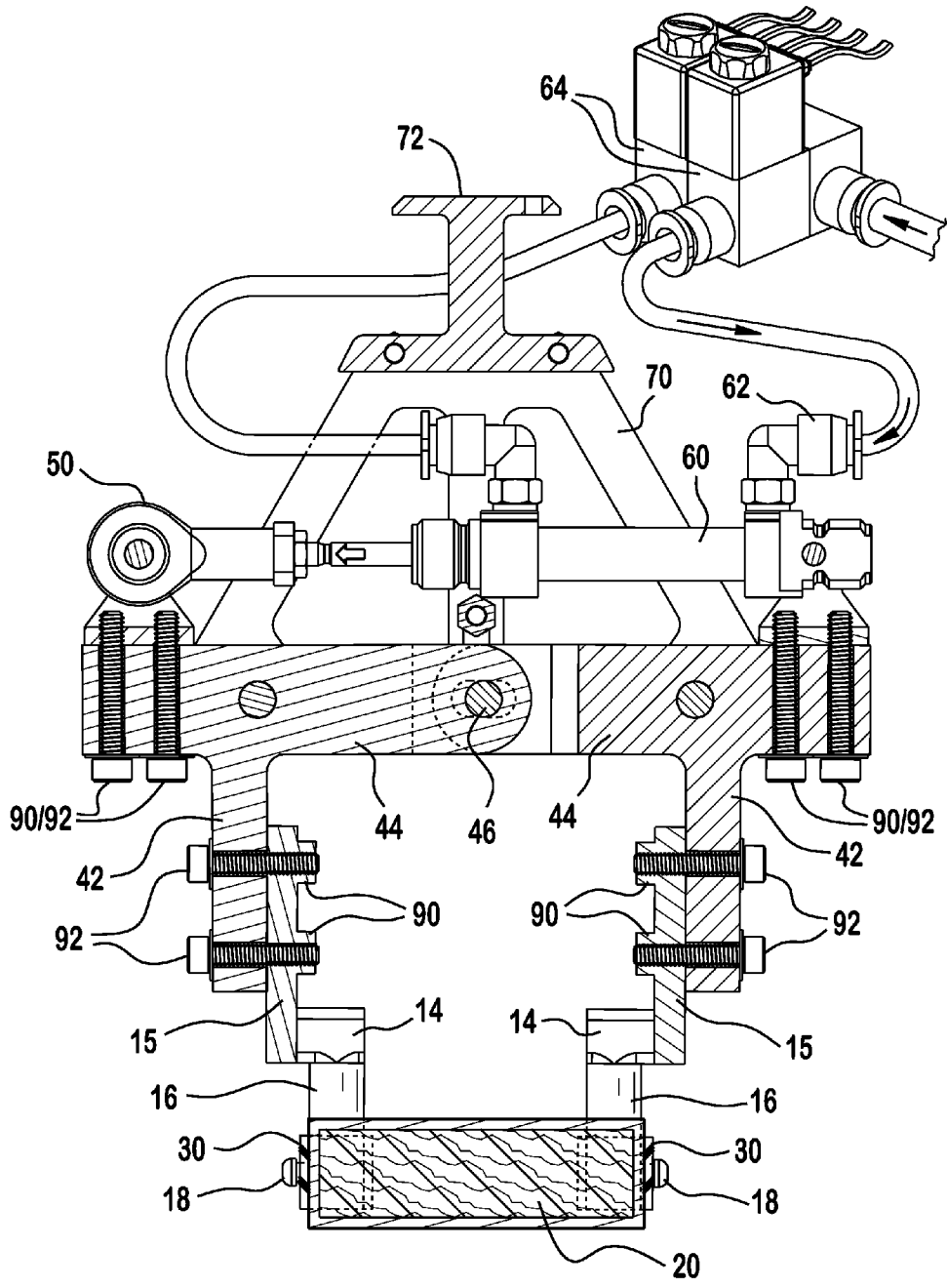
FIG. 9 is a side cross-section view of the automated gripping tool of FIG. 6 taken along line 9-9.
Figure 13:
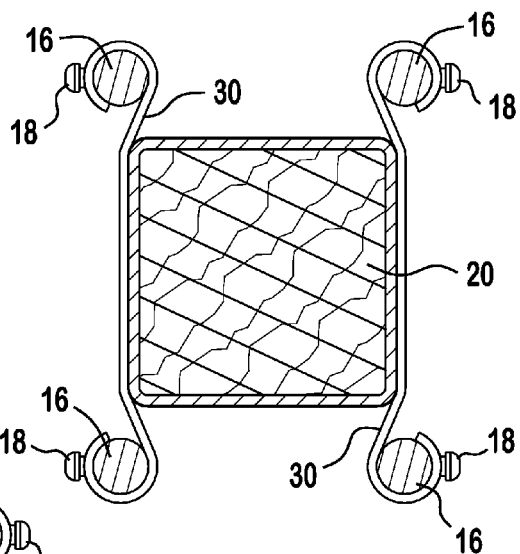
FIG. 13 is an overhead cross-section view of a pair of gripping arms of the automated gripping tool according to the invention, shown gripping a polygonal-shaped food product.
Figure 14:
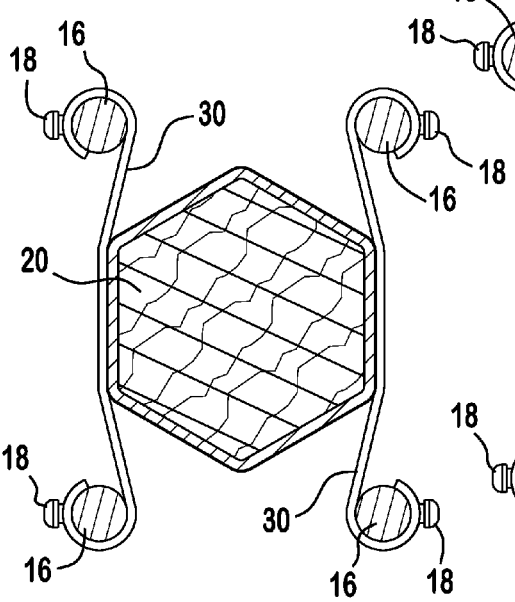
FIG. 14 is an overhead cross-section view of a pair of gripping arms of the automated gripping tool according to the invention, shown gripping a different polygonal-shaped food product.
Figure 15:
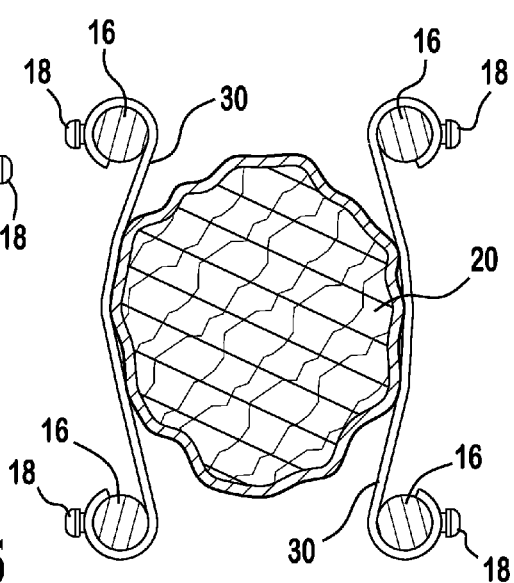
FIG. 15 is an overhead cross-section view of a pair of gripping arms of the automated gripping tool according to the invention, shown gripping an irregular shaped food product.
Figure 16:
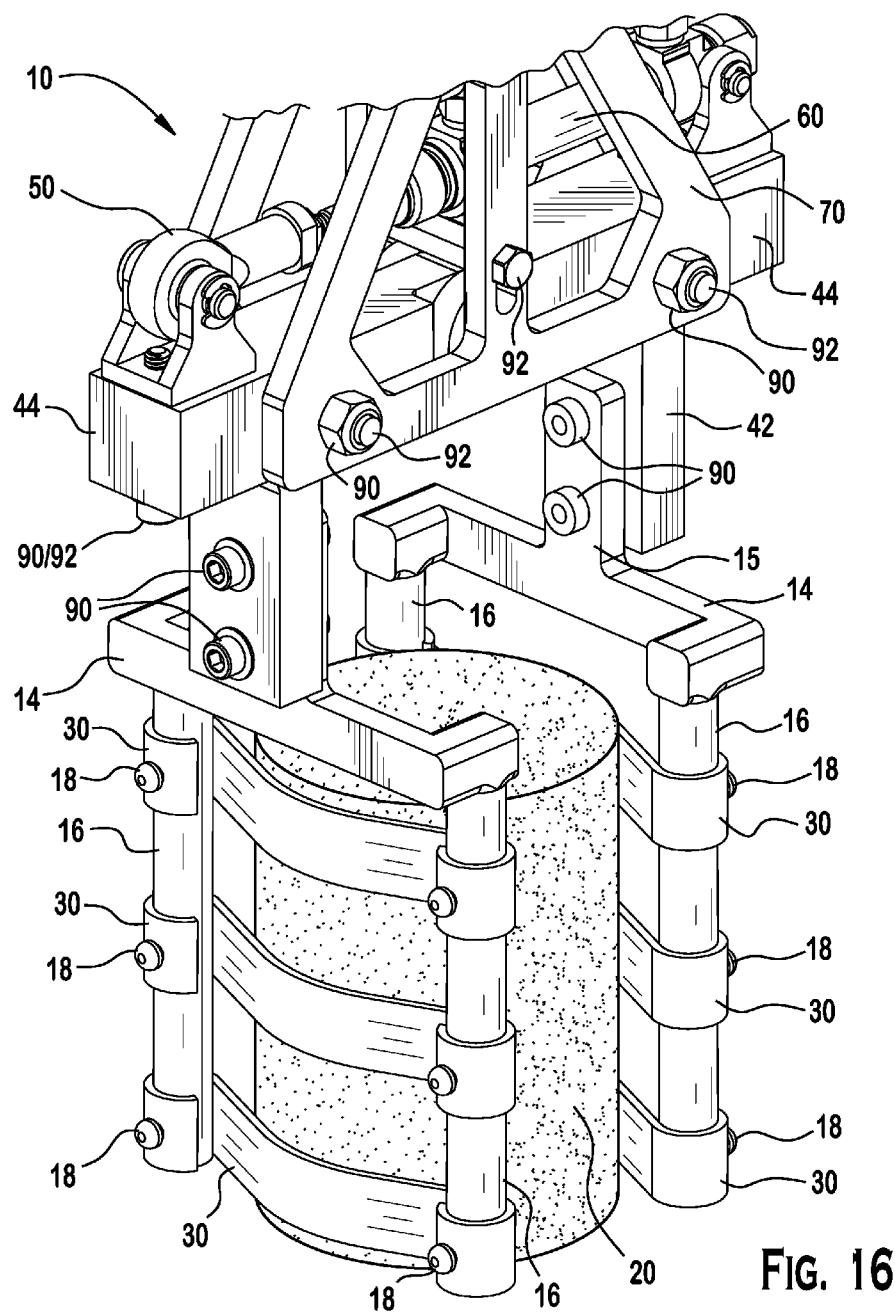
FIG. 16 is a perspective view of another automated gripping tool according to the invention, shown using a pair of multi-banded gripping fixtures.

FIGS. 8 and 13-15 show how the gripping arms 12 with removably secured flexible bands 30 are useful in handling food products 20 of a variety of shapes. FIG. 8 shows a generally circularly shaped food product 20. FIG. 13 shows a generally rectangular-shaped food product 20. FIG. 14 shows a generally six-sided food product 20. FIG. 15 shows an irregularly shaped food product 20.

The flexible bands 30 are composed of materials that are chosen in keeping with the properties of the food product to be handled. As described above, the flexible bands 30 are preferably made of a polymeric or elastomeric material. The flexible bands 30 may be designed to be regularly cleaned and reused or to be replaced rather than to be cleaned and reused.

The attachment points 18 on the vertical supports 16 of the gripping arms 12 may be made of any suitable material, such as plastic or metal, that secure the bands during operation and yet permit the bands to be replaced as needed.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An automated gripping tool for grasping a food product, comprising:
   a hinging unit;
   a frame supporting the hinging unit; and
   a pair of gripping arms facing each other and positioned apart from each other to provide a food product receiving space, each gripping arm
     a horizontal arm;
     a first vertical support connected to one end of the horizontal arm and extending downward therefrom;
     a second vertical support connected to the another end of the horizontal arm and extending downward therefrom; and
     a flange positioned between the first vertical support and the second vertical support and extending upward from the horizontal arm; and
     a flexible band positioned between and secured to the first vertical support and the second vertical support.

2. The automated gripping tool of claim 1, wherein the flexible band is removably attached to the first vertical support and the second vertical support.

3. The automated gripping tool of claim 1, wherein the flexible band is elastic.

4. The automated gripping tool of claim 1, wherein the hinging unit includes a pair of hinge arms pivotable with respect to each other about a pivot point.

5. The automated gripping tool of claim 4, wherein the pair of hinge arms are connected by a pin that is positioned at the pivot point.

6. The automated gripping tool of claim 5, wherein the hinging unit further includes a pair of control arms extending downward from the pair of hinge arms.

7. The automated gripping tool of claim 6, wherein the pair of control arms include a first control arm secured to one of the pair of hinge arms and a second control arm secured to the other of the pair of hinge arms.

8. The automated gripping tool of claim 7, wherein the pair of gripping arms are secured to distal ends of the first control arm and the second control arm respectively.

9. The automated gripping tool of claim 8, wherein the hinging unit is connected to a pneumatic actuator to rotate the pair of hinge arms.

10. The automated gripping tool of claim 1, wherein the frame is secured to a robotic arm.

11. An automated gripping tool for grasping a food product, comprising:
- a frame; and
- a pair of gripping arms supported by the frame and facing each other, the pair of gripping arms positioned apart from each other to provide a food product receiving space, each gripping arm:
  - a horizontal arm;
  - a first vertical support connected to one end of the horizontal arm and extending downward therefrom;
  - a second vertical support connected to the another end of the horizontal arm and extending downward therefrom; and
  - a flange positioned between the first vertical support and the second vertical support and extending upward from the horizontal arm; and
  - a flexible band positioned between and secured to the first vertical support and the second vertical support.

12. The automated gripping tool of claim 11, wherein the flexible band is removably attached to the first vertical support and the second vertical support.

13. The automated gripping tool of claim 12, wherein the flexible band is elastic.

14. The automated gripping tool of claim 13, wherein the pair of gripping arms extend inward to and outward from the food product receiving space.

15. The automated gripping tool of claim 11, wherein the frame is secured to a robotic arm.

* * * * *